Figure 1:
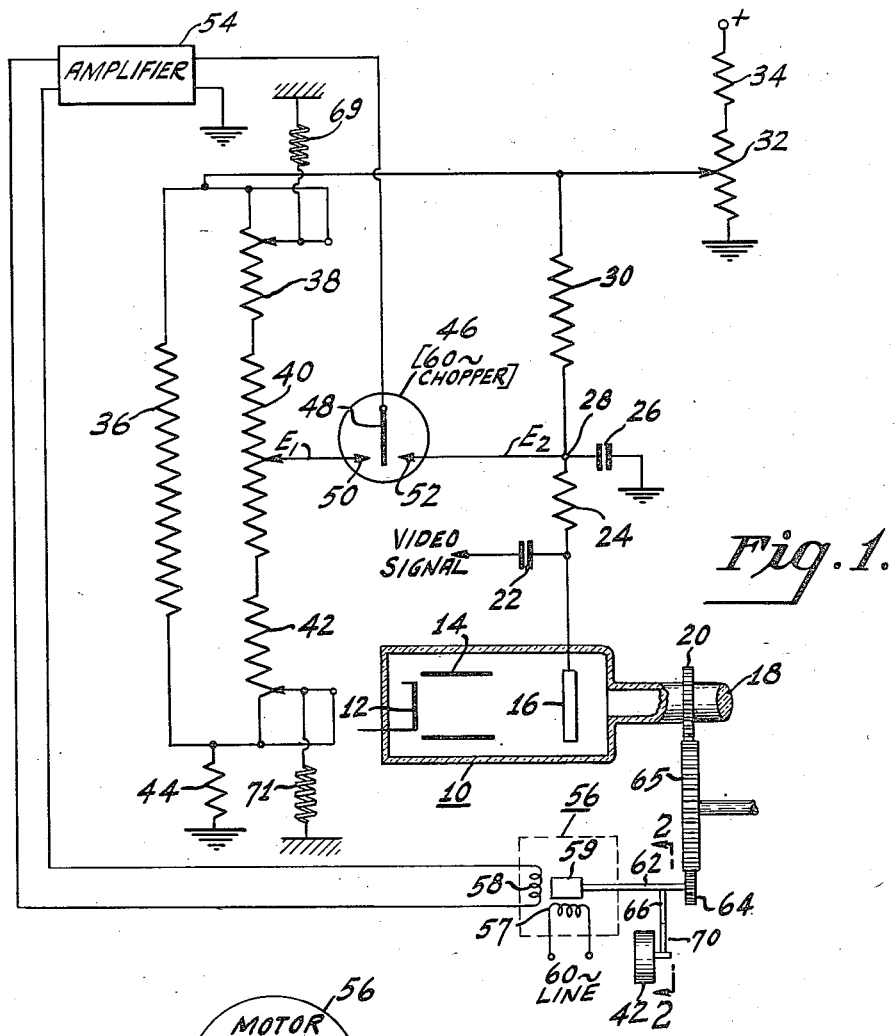

May 6, 1958 W. J. HANNAN 2,833,935
MOTOR CONTROL CIRCUIT
Filed Feb. 1, 1955

INVENTOR.
WILLIAM J. HANNAN
BY
ATTORNEY

United States Patent Office 2,833,935
Patented May 6, 1958

2,833,935

MOTOR CONTROL CIRCUIT

William James Hannan, Middle Village, N. Y., assignor to Radio Corporation of America, a corporation of Delaware Application February 1, 1955, Serial No. 485,399

The terminal fifteen years of the term of the patent to be granted has been disclaimed 12 Claims. (Cl. 250—201)

This invention relates to an improved motor control circuit and in particular to an improved circuit for stopping a load at a given position and maintaining it at that position until the sense of the control signal applied to the motor driving the load is reversed.

It is often desired in various applications to limit the rotation of a motor within certain predetermined limits. For example, in controlling the automatic opening and closing of the iris diaphragm in a television camera, the maximum rotation of the iris adjustment is limited to about 90°. If the motor that rotates the iris is not stopped at the limits of the iris adjustment, damage may result to the lens and iris, or the motor gears, or both. The motor may attempt to rotate the iris past its stopping point when lighting conditions change drastically. A limit switch generally does not provide a complete solution for this problem because it does not permit the motor to be re-energized when the light level increases.

An object of this invention is to provide improved means for halting the rotation of a motor when predetermined limits have been reached.

Another object of the present invention is to provide an improved motor control circuit which stops a motor at a limit position and, when the sense of the signal driving the motor changes, drives the motor away from the limit.

Another object is to provide improved means for preventing damage to the diaphragm and lens of a camera device in systems in which the diaphragm opening is automatically adjusted by a motor in response to changes in scene brightness.

In a typical embodiment of the present invention, the motor control circuit includes means for deriving from the load being driven by the motor an output control voltage indicative of the departure of the latter from a desired position. The means for producing the control voltage includes, in a preferred form of the invention, means producing a reference voltage and means driven by the load for producing a comparison voltage. The difference between said two voltages is the control voltage, the load being driven in the proper sense to reduce the same to zero.

According to the invention, when a predetermined limit is approached, the amplitude of the reference voltage is changed to reduce the difference between it and the comparison voltage to zero, whereby the motor is stopped. The arrangement, in one form of the invention, includes at least one rheostat in circuit with the reference voltage source, and means such as a cam, or the like, on the motor shaft for actuating the rheostat when a limit is approached.

Figure 2:
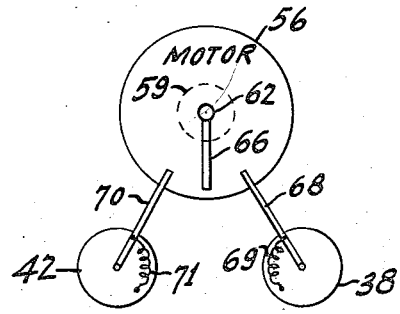

The invention will be described in greater detail with reference to the accompanying drawing in which similar reference characters apply to similar elements, and in which:

Figure 1 is a schematic diagram of a typical embodiment of the present invention; and Figure 2 is a diagrammatic representation of the drive motor and rheostats shown in Figure 1.

Referring to Figure 1, a television camera tube 10, such as a Vidicon, is illustrated in abbreviated form. A lens 18 projects an image on a photoconductive target plate 16 which is scanned by an electron beam from an electron gun illustrated only by a cathode 12 and an accelerating anode 14. The amount of light passing through the lens is controlled by an iris diaphragm 20. The positive direct-current voltage supplied to the target plate 16 of the camera tube 10 is derived from the movable arm of a supply potentiometer 32 which is part of a series network comprising the supply potentiometer 32 and a fixed supply resistor 34 extending from a source of positive direct-current supply voltage to ground. The moving arm of the supply potentiometer 32 is connected through a pair of series load resistors 30 and 24 to the target plate 16. The movable arm of the supply potentiometer 32 is also connected to one side of a parallel reference network, one branch of which comprises a fixed resistor 36 and the other branch of which comprises a first rheostat 38, a reference potentiometer 40 and a second rheostat 42 all in series. The parallel network is connected to ground through a fixed resistor 44. The movable arm of the reference potentiometer 40 is connected to one contact of a vibrator 46. The other contact of the vibrator is coupled to the junction 28 between the series load resistors 30 and 24. A condenser 26 is also connected from this junction 28 to ground.

The iris 20 of the camera tube 10 is rotated by a gear 65 which, in turn, is rotated by a gear 64 affixed to the shaft 62 of a two-phase motor 56. (It is understood, of course, that other gearing arrangements are possible.) One of the field coils 57 of the motor 56 is coupled directly to the 60-cycle line voltage and the other field coil 58 is coupled through an amplifier 54 to the moving arm 48 of the vibrator 46. The moving arm 48 is vibrated at the line frequency, i. e., 60 cycles per second by an electromagnet or the like (not shown).

In operation, the iris opening ($f$-stop) is originally set to provide a certain amount of illumination on the target plate 16. This results in an average level of direct-current output proportional to the amount of incident light striking the photosensitive target 16 and, therefore, a given direct-current voltage $E_2$ (comparison voltage) at the junction 28. Variations in this direct current are smoothed out by the filter action of capacitor 26, load resistor 30 and a portion of the supply potentiometer 32. The reference potentiometer 40 is adjusted so that the voltage $E_1$ (reference voltage) obtained from its moving arm is equal to this initial value of $E_2$. Thereafter, a change in the average amount of scene brightness will result in a change in the average amount of output current from the target plate 16 of the camera tube 10 and, consequently, a change in the direct-current voltage $E_2$. A potential difference (the control voltage) will then exist between the voltages $E_2$ and $E_1$. The vibrator 46 then converts this potential difference into a 60 cycle alternating wave, applies it through its vibrating arm 48 to the amplifier 54 and thence to the field coil 58 of the two-phase motor 56. Application of energy to this coil 58 rotates the motor 56 in the proper sense to adjust the iris 20 to compensate for the change in scene brightness. This, in turn, readjusts the output current of the camera tube 10 to its original value. The voltage $E_2$ at the junction 28 of the load resistors 30 and 24 is then again equal to the reference voltage $E_1$ and the rotation of the motor 56 ceases. Of course, the direction in which the motor 56 turns is determined by the polarity of the voltage $E_2$ with respect to the reference voltage $E_1$ and is arranged to compensate for the change in scene brightness which initiates the rotation. The rheostats 38 and 42, in series with the reference potentiometer 40, form part of the motor limit circuit. Referring to Figure 2, the rheostats 38 and 42 are mounted on either side and somewhat below the shaft 62 of the motor 56. Projecting arms 68 and 70 are affixed to the moving arms of the rheostats 38 and 42 respectively and the projecting arm 66 is affixed to the shaft 62 of the motor 56. The rheostats 38 and 42 are positioned so that their projecting arms 68 and 70 respectively engage projecting arm 66 of the motor 56 at the limits of the iris adjustment.

In operation, if the average scene brightness continues to decrease past a given value, projecting arm 66 engages arm 70 of rheostat 42. This occurs immediately before the iris 20 reaches its limit of adjustment in this direction (maximum opening). The resistance from ground to the moving arm of the reference potentiometer 40 thereby increases as does the value of the reference voltage $E_1$. When voltage $E_1$ equals increased voltage $E_2$, the rotation of the motor 56 is stopped. If the average scene brightness increases to a very high value and brings the iris adjustment to the other extreme (minimum opening), the projecting arm 66 of the motor 56 engages the projecting arm 68 of the first rheostat 38. This increases the resistance between the moving arm of the supply potentiometer 32 and the moving arm of the reference potentiometer 40 thereby decreasing the reference voltage $E_1$. When $E_1$ equals the reduced value of $E_2$ the motor stops. The moving arms of the rheostats 38 and 42 are brought back to their original positions after disengagement from the projecting arm 66 of the motor 56 by means of springs 69 and 71.

By proper choice of component values, operation of either rheostat can be made to produce a substantial change in the reference potential so that very little rotation of the motor occurs after a rheostat has been engaged. This may also be effected through a gearing system between the projecting arm and shaft of each rheostat whereby a small movement of the arm produces a large change in resistance.

Mechanical limit stops may be employed with the system described above. By proper choice of component values, the rheostats 38 and 42 may be made to stop the rotation of the motor 56 before its mechanical limit stops are reached, or to slow down the rotation so that no damage results when the limit stops are encountered.

It will be appreciated that a direct-current motor may be employed in place of the alternating-current motor 56 shown in Figure 1. Some changes in the apparatus are then required. For example, the chopper 46 and the amplifier 54 may be replaced by a servo amplifier and an amplidyne generator.

What is claimed is:

1. A motor control system comprising, in combination, a source of reference voltage; a motor; means coupled to said motor and responsive to its movement for producing a comparison voltage having a sense relative to said reference voltage indicative of the direction of departure of said motor from a desired position; means for deriving from said reference voltage and said comparison voltage, when they are different, a control voltage for driving said motor in the proper sense to reduce said control voltage to zero; and limit means responsive to rotation of said motor past a predetermined limit for changing said reference voltage in the proper sense to reduce said control voltage to zero, said limit means including resistor means in circuit with said reference voltage source, and means rotatable with the motor and engageable with said resistor means when said motor rotates to said predetermined limit for changing the value of said resistor means in the proper sense to reduce said control voltage to zero.

2. A motor control system comprising, in combination, potentiometer means; connection means for connecting a source of direct voltage of predetermined value across said potentiometer means; a tap on said potentiometer means for providing a direct voltage reference level; a motor; load means coupled to said motor and responsive to its movement for producing a comparison voltage having a sense relative to said reference voltage indicative of the direction of departure of said motor from a desired position; means for deriving from said reference voltage and said comparison voltage, when they are different, a control voltage for driving said motor in the proper sense to reduce said control voltage to zero; and limit means including a portion of said potentiometer means engageable with said motor when the latter rotates past a predetermined limit for adjusting said level of reference voltage in the proper sense to reduce said control voltage to zero.

3. A motor control system as set forth in claim 2, further including second limit means comprising a portion of said potentiometer means engageable by said motor when the latter rotates past a second limit for changing said reference voltage in the proper sense to reduce said control voltage to zero.

4. A motor control system as set forth in claim 3, further including a fixed support, mechanical bias means affixed to each said limit means and to said fixed support for returning each said limit means to its original position when the comparison voltage returns to a level less than that required to generate a control voltage capable of driving said motor past each said limit respectively.

5. A motor control system as set forth in claim 4, wherein said means for deriving said control voltage comprises a means coupled to said tap on said potentiometer means and to said load means for deriving an alternating voltage depending in magnitude and sense on the difference between said reference voltage and said comparison voltage, and amplifying means coupled to said last-named means for amplifying said control voltage, and wherein said motor comprises an alternating-current motor one phase winding of which is energized by said control voltage.

6. A motor control system as set forth in claim 4, wherein said means for deriving said control voltage comprises amplifying means coupled to said tap on said potentiometer and to said load means for amplifying said difference in potential between said reference voltage and said comparison voltage and a direct-current motor energized by the output of said amplifying means.

7. A motor control system as set forth in claim 4, wherein said load means comprises a television camera tube comprising at least a target plate containing a mosaic of photoconductive material, means focusing light on said mosaic for producing charges thereon in accordance with the intensity of the light image thereon, means for controlling the amount of light focused on said mosaic, and means scanning an electron beam across said mosaic for generating electric currents proportional to said charges thereon; means coupled to said motor for rotating said light-control means; and resistor means coupled to said target plate for producing said comparison voltage from the output currents derived from the scanning of said target plate.

8. A motor control system as set forth in claim 4 wherein said bias means comprises a pair of springs, one connected to each said limit means.

9. In combination, potentiometer means; connection means for connecting a source of electrical energy of predetermined value across said potentiometer means; a tap on said potentiometer means providing a reference signal; connections for a drive means for driving a load, said drive means being one of the type which drives in one direction in response to an applied electrical driving signal of one sense, and in the opposite direction in response to an applied electrical driving signal of the opposite sense; means for producing a comparison signal having a sense relative to said reference signal indicative of the sense of a change in a given condition of said load; means for deriving from said reference signal and said comparison signal, when they are different, a control signal of a sense such that if applied to said connections for said drive means, the drive means would drive said load in a direction to compensate for said change in condition and the control signal would thereby be reduced to zero, and for applying said control signal to said connections for said drive means; and limit means including a portion of said potentiometer means engageable with said drive means solely when the latter attempts to drive said load beyond a given position for adjusting the amplitude of said reference signal in the proper sense to reduce said control signal to zero.

10. In combination, potentiometer means; connection means for connecting a source of electrical energy of predetermined value across said potentiometer means; a tap on said potentiometer means providing a reference signal; connections for a drive means for driving a load, said drive means being one of the type which drives in one direction in response to an applied electrical driving signal of one sense, and in the opposite direction in response to an applied electrical driving signal of the opposite sense; means for producing a comparison signal having a sense relative to said reference signal indicative of the sense of a change in a given condition of said load; means for deriving from said reference signal and said comparison signal, when they are different, a control signal of a sense such that if applied to said connections for said drive means, the drive means would drive said load in a direction to compensate for said change in condition and the control signal would thereby be reduced to zero, and for applying said control signal to said connections for said drive means; and limit means including one portion of said potentiometer means engageable with said drive means solely when the latter attempts to drive said load beyond a limit position in one direction of movement, for adjusting the amplitude of said reference signal in the proper sense to reduce said control voltage to zero, and including another portion of said potentiometer means engageable with said drive means solely when the latter attempts to drive said load beyond a limit position in another direction of movement, for adjusting the amplitude of said reference signal in the opposite sense to reduce said control signal to zero.

11. In combination, a light sensitive device including an element for producing a current having an amplitude proportional to the amount of light reaching said element from a source of light, and a controllable diaphragm between said source and said element for adjusting the amount of said light passing from said source to said element, said diaphragm having limits of adjustment; drive means operatively coupled to said diaphragm for adjusting the latter, said drive means being one of the type which drives in one direction in response to an applied control signal of one sense and in the opposite direction in response to an applied control signal of the opposite sense; means coupled to said element for deriving from said current a comparison voltage having an amplitude proportional to said current; a source providing a reference voltage; means for deriving from said reference voltage and said comparison voltage, when they are different, a control voltage having a sense such that when applied to said drive means, the latter drives said diaphragm in a direction to reduce said control voltage to zero, and for applying said control voltage to said drive means; and limit means connected to be driven by said drive means solely when the drive means attempts to drive said diaphragm beyond one of said limits of adjustment, and connected to said source of reference voltage for changing said reference voltage in a direction to reduce said control voltage to zero.

12. In the combination as set forth in claim 11, said light sensitive device comprising a television camera, and said element comprising the target plate of said camera.

References Cited in the file of this patent

UNITED STATES PATENTS

| | | |
|---|---|---|
| 1,880,020 | Kwartin | Sept. 27, 1932 |
| 1,906,441 | Alexanderson et al. | May 2, 1933 |
| 2,389,939 | Sparrow | Nov. 27, 1945 |